United States Patent
Werner

(10) Patent No.: US 6,824,012 B2
(45) Date of Patent: Nov. 30, 2004

(54) PLURAL COMPONENT DISPENSING APPARATUS

(75) Inventor: Neal A. Werner, Bloomington, MN (US)

(73) Assignee: Graco Minnesota Inc., Minneapolis, MN (US)

(*) Notice: Subject to any disclaimer, the term of this patent is extended or adjusted under 35 U.S.C. 154(b) by 35 days.

(21) Appl. No.: 10/130,863

(22) PCT Filed: Dec. 1, 2000

(86) PCT No.: PCT/US00/32709

§ 371 (c)(1),
(2), (4) Date: May 22, 2002

(87) PCT Pub. No.: WO01/40737

PCT Pub. Date: Jun. 7, 2001

(65) Prior Publication Data

US 2002/0170919 A1 Nov. 21, 2002

Related U.S. Application Data

(60) Provisional application No. 60/168,964, filed on Dec. 3, 1999.

(51) Int. Cl.$^7$ ................................................ G01F 11/00
(52) U.S. Cl. .............................. 222/1; 222/57; 222/61; 222/145.6; 222/145.7
(58) Field of Search ................................. 222/1, 55, 57, 222/61, 145.5, 145.6, 145.7, 145.8

(56) References Cited

U.S. PATENT DOCUMENTS

| | | | | |
|---|---|---|---|---|
| 4,341,327 A | * | 7/1982 | Zeitz | 222/63 |
| 5,038,971 A | * | 8/1991 | Gayer et al. | 222/1 |
| 5,332,125 A | * | 7/1994 | Schmitkons et al. | 222/1 |
| 5,499,745 A | * | 3/1996 | Derian et al. | 222/136 |
| 5,857,589 A | * | 1/1999 | Cline et al. | 222/1 |
| 5,920,829 A | * | 7/1999 | Bretmersky et al. | 222/55 |

* cited by examiner

Primary Examiner—Joseph A. Kaufman
(74) Attorney, Agent, or Firm—Douglas B. Farrow

(57) ABSTRACT

A dispensing apparatus (10) is capable of robotically dispensing plural component materials such as sealants and adhesives with the same precision as single component products and yet will maintain ratio assurance and integrity for mixing the two materials. First look at the flow rate and if the flow rate is too high, decrease is needed on one of the components. The ratio error is then looked at and the flow rate/pressure differential for the material which is there in excess is decremented. Another level of control is provided in that the ratio error is continually examined and the direction of the ratio error is used for additional control. This provides very precise control of ratio and flow and helps prevent oscillation, hunting and other undesirable characteristics in such a system.

2 Claims, 5 Drawing Sheets

PLURAL COMPONENT DISPENSING APPARATUS

This application claims the benefit of Provisional Application No. 60/168,964, filed Dec. 3, 1999.

TECHNICAL FIELD

Devices for robotically dispensing sealants and adhesives on to parts have become increasingly popular in recent years.

BACKGROUND ART

Products such as Graco's PRECISIONFLO unit using technology such as shown in U.S. Pat. No. 5,847,285, the contents of which are incorporated by reference, have become increasingly popular with automotive manufacturers in order to provide precision application of a bead of (single component) adhesive for various applications. Such units typically dispense at pressures ranging from around 600 PSI to 3000 PSI. Recently, the material manufacturers of such sealants and adhesives have been producing plural component materials which provide increased performance for the manufacturer.

It is therefore an object of this invention to provide a dispensing apparatus which is capable of dispensing such plural component materials with the same precision as the single component products and yet will maintain ratio assurance and integrity for mixing the two materials.

DISCLOSURE OF THE INVENTION

Various parties involved in such manufacture use different terms for the materials involved. The major component of the plural material is also commonly referred to in the industry as the B component or the resin component. Similarly, the minor component is also often referred to as the A component, or activator, or catalyst.

Overall, the scheme can be characterized by saying first look at the flow rate. If the flow rate is too high, decrease is needed on one of the components so the ratio error is then looked at and the flow rate/pressure differential for the material which is there in excess is decremented. Another level of control is provided in that the ratio error is continually examined and the direction of the ratio error is used for additional control. This provides very precise control of ratio and flow and helps prevent oscillation, hunting and other undesirable characteristics in such a system.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1B:
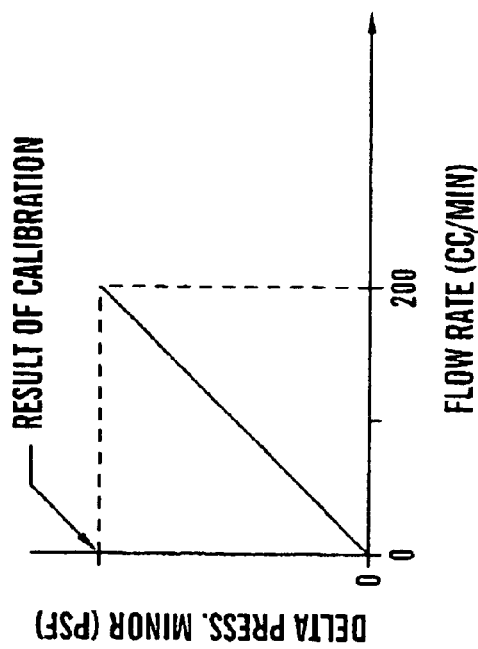
FIG 1B shows the result of the flow rate calibration for the minor material.
Figure 1A:
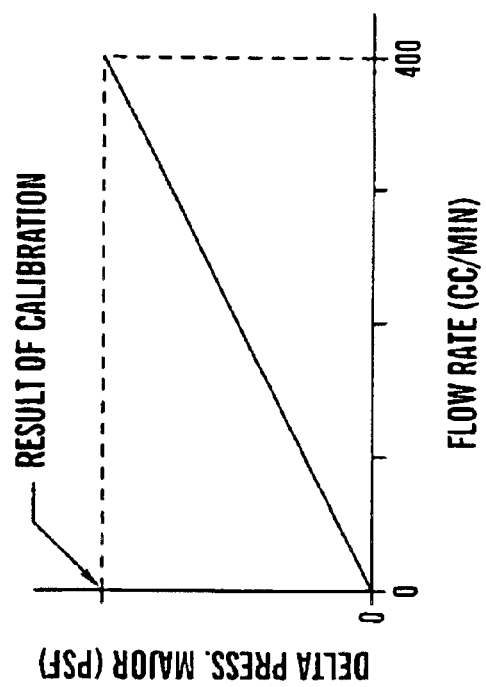
FIG. 1A shows the general result of the flow calibration routine for the major material.
Figure 2:
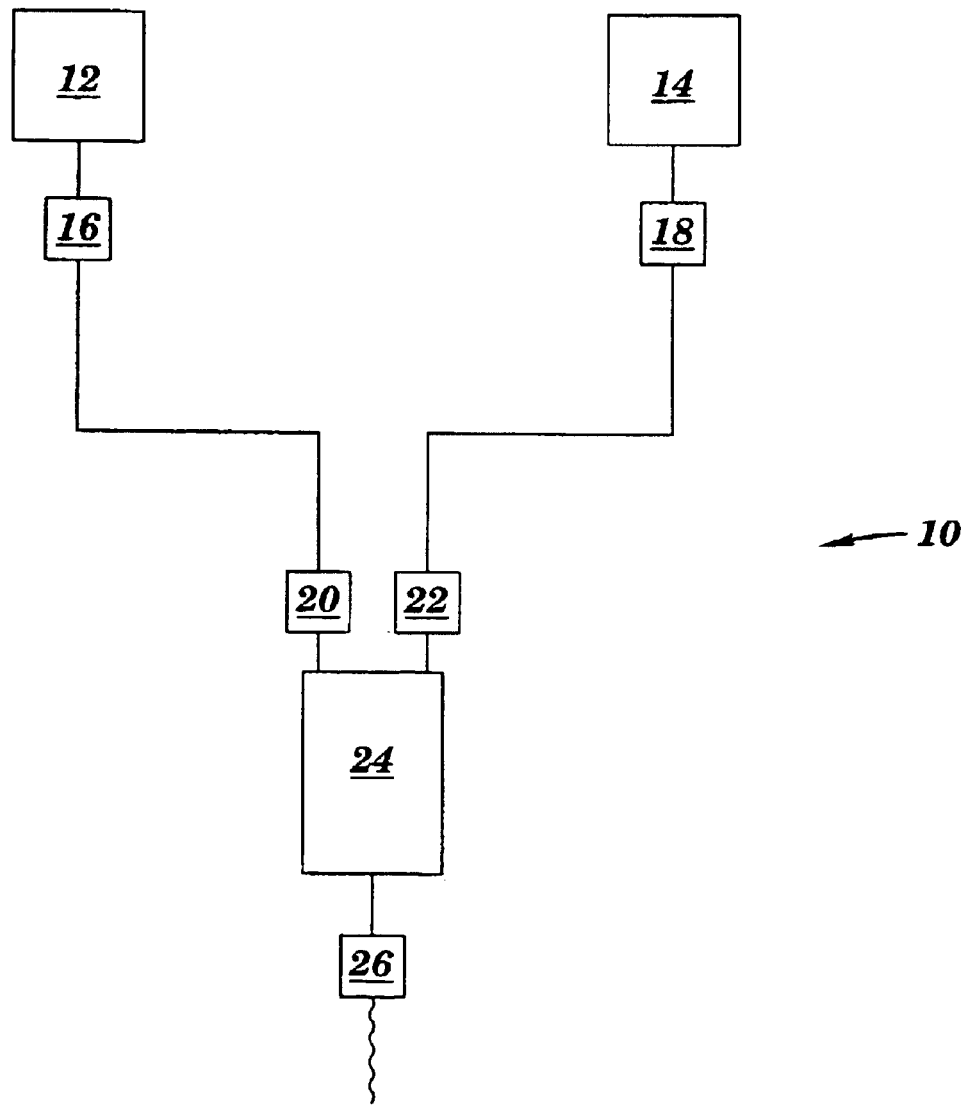
FIG. 2 is a schematic representation of the dispensing apparatus of the instant invention.

In use, the user sets the desired ratio, the maximum flow rate, and the number of volume updates per liter and the flow meter K factors (pulses/liter). Pressure loops are adjusted with Ki (integral) and Kp (proportional) gains independently for the major and minor materials. Pressure control of the two sides is performed on the basis of the pressure change between the outlet of the dispense valve and the inlet of the mixer.

In the instant invention, generally designated 10, sources of major and minor components at relatively elevated pressures 12 and 14 respectively are connected to first and second flow meters 16 and 18 which are in turn connected to pressure regulators 20 and 22, mixer 24 and dispense valve 26.

Gun calibration procedure is performed whereby major and minor materials are calibrated at the same time independently. The calibration routine provides the delta pressure required to obtain the maximum flow of the major and minor materials. In the example here the material requires a ratio of 2:1 of major to minor materials. The maximum total flow rate desired is 600 cc/minute. The calibration routine returns the delta pressure required to achieve 400 cc/minute of major volume and the delta pressure required to achieve 200 cc/minute of the minor volume.

Figure 3:
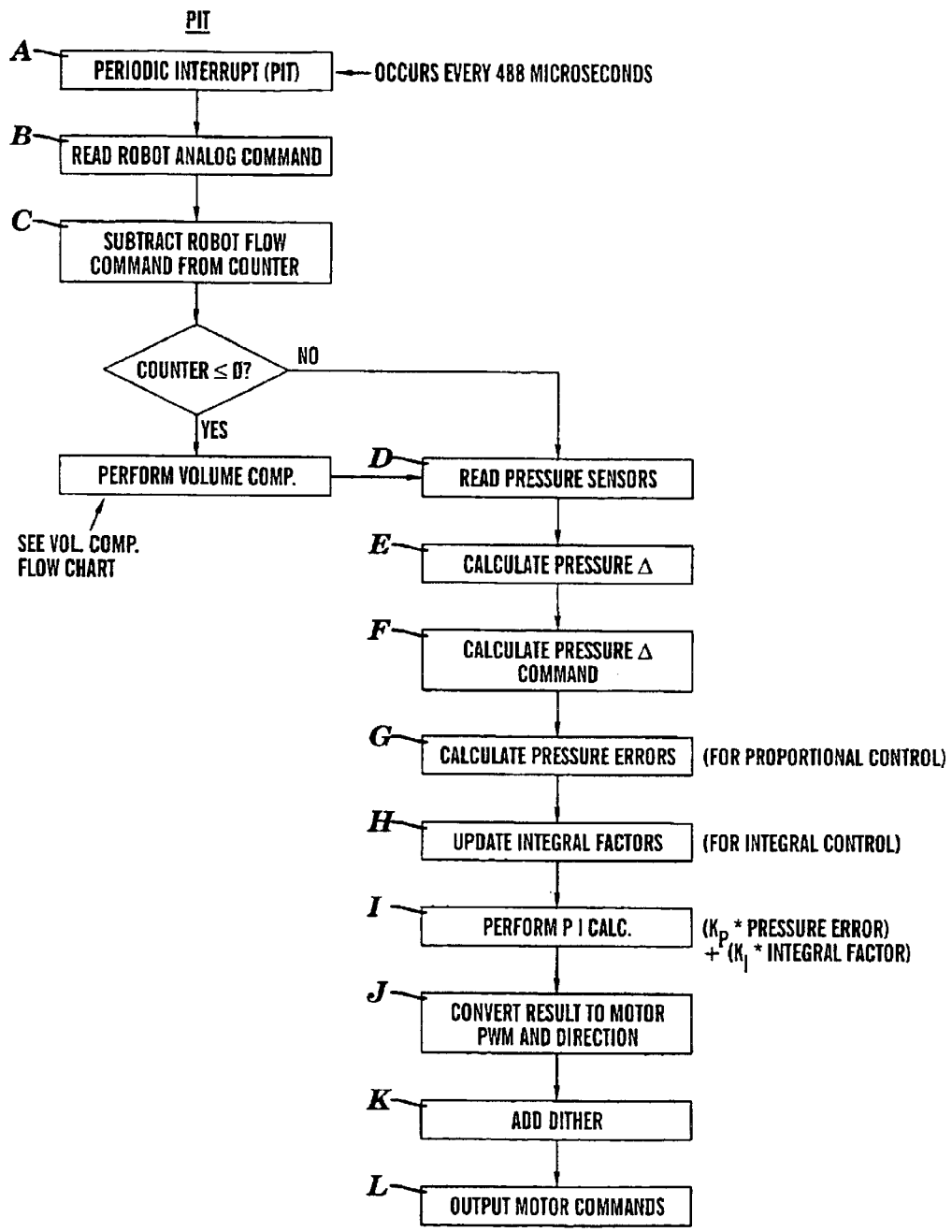
FIG. 3 is a flow chart of the pressure control loop of the instant invention.

Referring to the drawing figures, circled letters are shown which refer to portions marked in the attached source code. The pressure control is relatively straight forward as set forth in FIG. 3. The updating of pressure and volume compensation occurs every 488 microseconds. First, the volume for partial pulses is calculated by interpolation when the actual volume integral is updated. During dispensing, each time a flow meter pulse is received, the actual volume integral is decremented by the cc/pulse of the respective meter.

Figure 4A:
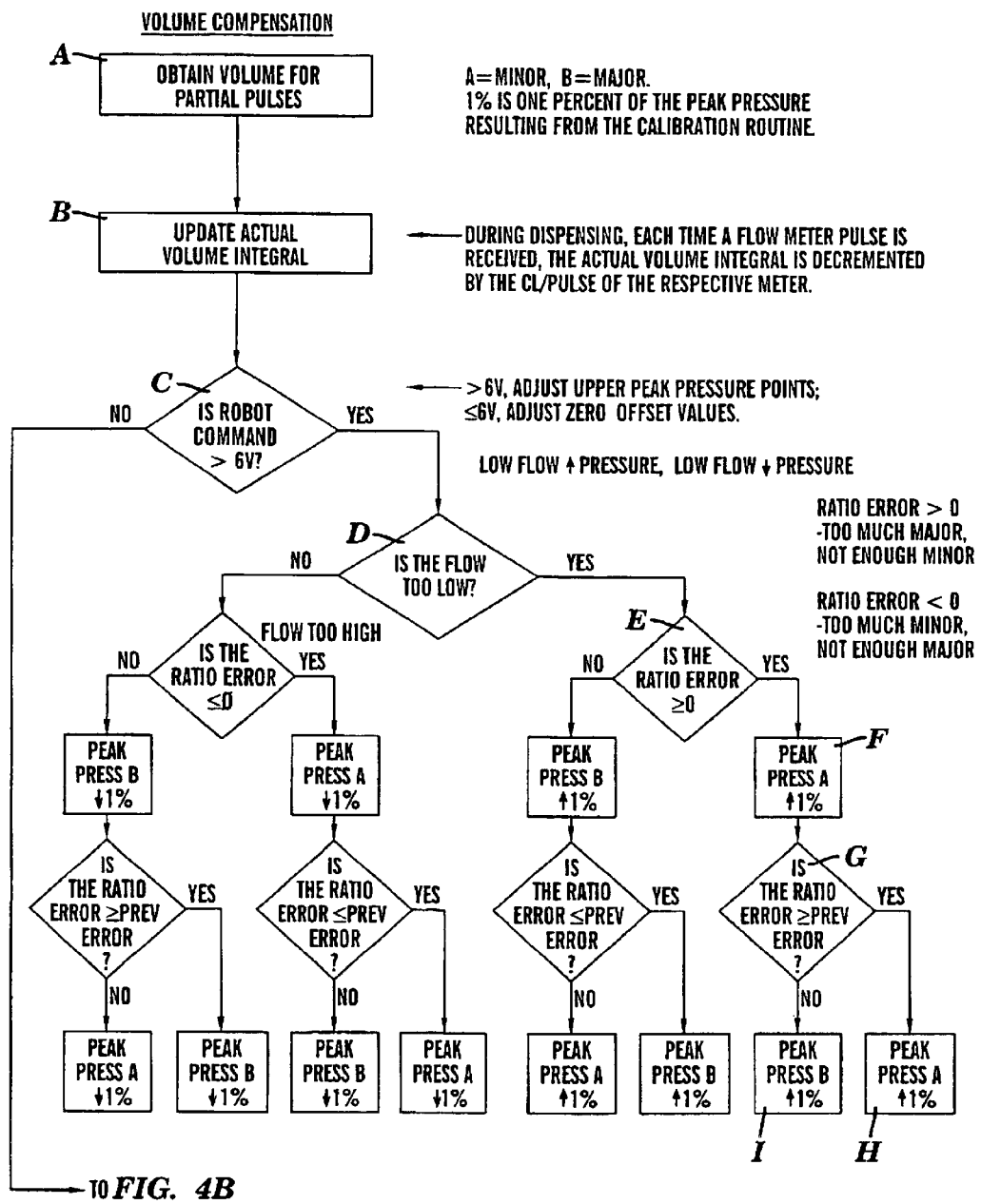
FIGS. 4A–4B is a flow chart showing the volume compensation scheme.
Figure 4B:
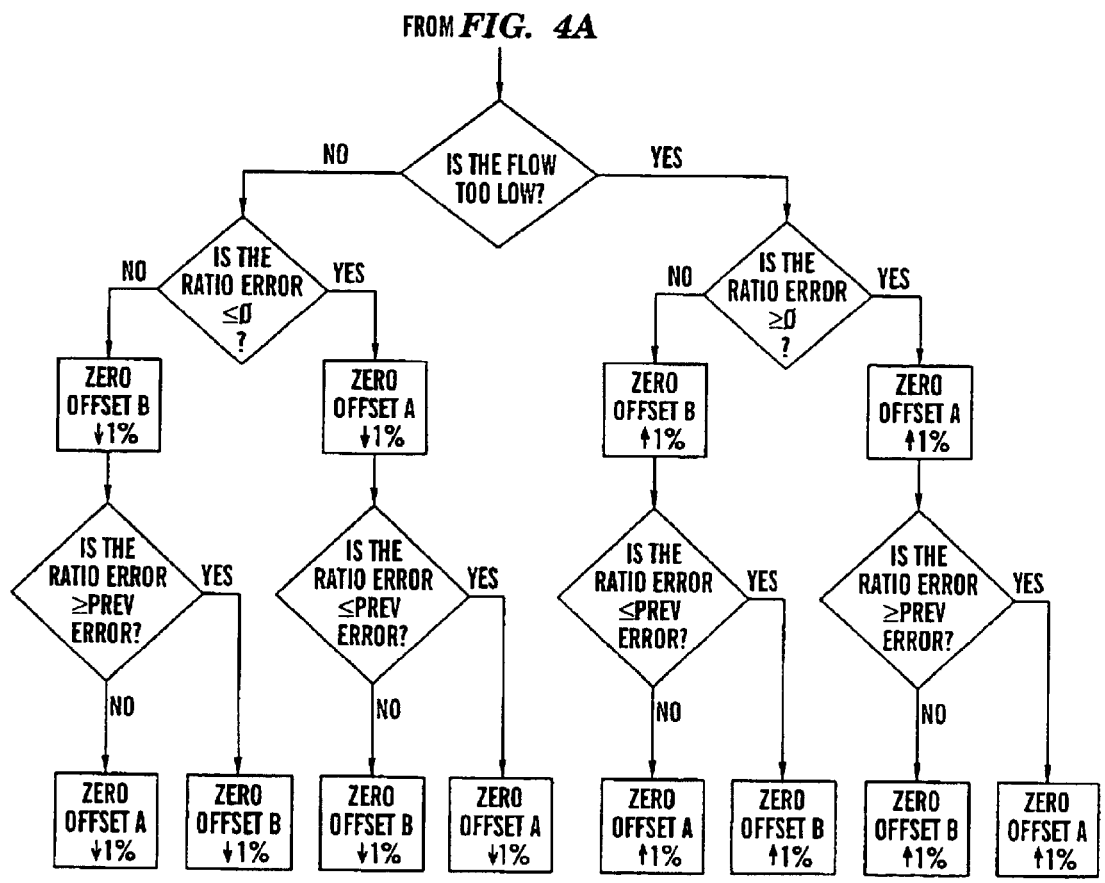

As used herein the 1% referred to is 1% of the peak pressure resulting from the calibration routine. The robot then looks to see if the flow is in the upper or lower half of the total range. If in the upper half of the range (typically greater than a 6 volt robot command) the upper peak pressure point is adjusted and if less than or equal to 6 volts, the zero offset value is adjusted. This discussion will only refer to the robot command being greater than 6 volts or in the upper half of the pressure range however as can be seen from the FIG. 4 flow chart, the logic is similar for adjustment in the lower end.

As indicated, the actual volume integral is updated on a periodic basis for both materials and a ratio error is then calculated. Initially the controller looks to see if the flow is too low. If the flow is too low the controller looks to see if the error ratio is greater than zero, that is if there is too much major material and not enough minor material. If the error ratio is greater than zero, the peak pressure of A is increased by 1%. The controller then looks to see if the error ratio is greater than the previous error ratio. If it is, the peak pressure of A is increased by an additional 1%. However if it is not greater than the previous error ratio, that is, if it is coming back toward the desired ratio, the peak pressure of B is increased by 1%. If the ratio error is not greater than or equal to zero, that means there is too much minor component and not enough major and the peak pressure of B is increased by 1%. The system then looks to see if the ratio error is less than the previous ratio error and if it is the peak pressure of B is increased by 1% and if not the peak pressure of A is increased by 1%.

Similarly, it the flow is too high, the system looks at the error ratio and if less than zero the peak pressure of A is decreased by 1%. The system then looks to see if the ratio error is less than the previous error and if it is the peak pressure of A is decremented by an additional 1% and if not, the peak pressure of B is decremented by 1%. Similarly, if the ratio error is not less than zero, the peak pressure of B is decremented by 1% and if the ratio error is greater than or equal to the previous error the peak pressure of B is decremented by an additional 1% and if not the peak pressure of A is decremented by 1%.

It is contemplated that various changes and modifications may be made to the dispensing apparatus without departing from the spirit and scope of the invention as defined by the following claims.

What is claimed is:

1. A method for dispensing plural component materials comprised of major and minor components at relatively elevated pressures at a predetermined flow rate, a predetermined maximum flow and at a predetermined ratio, the method comprising the steps of:

supplying said major and minor components at relatively elevated pressures;

measuring the amount of flow of each of said major and minor components during a relatively short period of time;

comparing the combined flow of said major and minor components during said period of time to said predetermined flow rate and if the measured flow rate is too high, examining the measured ratio and decrementing the flow for the material which is there in excess by a fixed percentage of said predetermined maximum flow; and if the measured flow rate is too low, examining the measured ratio and incrementing the flow for the material which is insufficient by a fixed percentage of said predetermined maximum flow.

2. The method for dispensing plural component materials of claim 1 wherein the direction of change of ratio error formed by the difference between said predetermined ratio and said measured ratio is taken into account during correction.

* * * * *